United States Patent Office 3,050,486
Patented Aug. 21, 1962

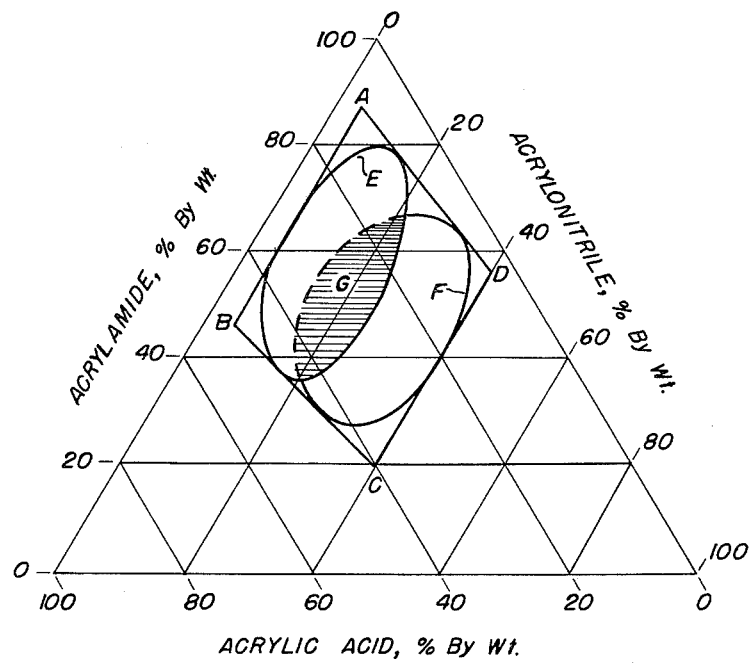

3,050,486
COATING COMPOSITION FOR PAPER COMPRISING A MINERAL PIGMENT AND AN ACRYLIC ACID-ACRYLAMIDE-ACRYLONITRILE COPOLYMER AS PRINCIPAL COATING COMPONENT
Daniel D. Ritson, Riverside, and Tzeng Jiueq Suen, New Canaan, Conn., assignors to American Cyanamid Company, New York, N.Y., a corporation of Maine
Filed May 13, 1959, Ser. No. 814,131
6 Claims. (Cl. 260—29.6)

This is a continuation-in-part of our copending application Serial No. 679,705, filed on August 22, 1957, now abandoned.

The present invention relates to coating compositions useful for the manufacture of coated cellulosic webs and to cellulosic webs coated therewith.

The manufacture of coating compositions for paper is an important specialty of the papermaking art and is generally performed by preparing a fluid aqueous dispersion of a mineral pigment in aqueous medium containing a small but effective amount of an adhesive adapted to bind the pigment particles together, applying the composition to the surface of the web, drying the web, and developing gloss by calendering.

Coated cellulosic webs are prized for their smooth and glossy surface, making them particularly useful as stock for high quality printing. The coated webs (paper, cardboard, and the like) are generally printed on high-speed rotary presses. The ink being more or less viscous, the operation tends to pick the coating from the paper, so that the adhesion of the coating to itself and to the paper must be strong. As the coated paper or board may come into contact with moisture during printing or during normal use, it is also necessary that the coating be resistant to attack by water.

A substantial advance in the art was occasioned by the discovery that coating compositions containing certain water-soluble acrylamide-acrylic acid copolymers as adhesive yield excellent coatings when applied to paper, etc., and dried. A necessary part of the process for development of adequate wet-rub resistance involved treating the coated paper with aqueous alum solution so as to convert the polymer to insoluble aluminum salt form. Compositions of the foregoing type and their application to paper (with the alum treatment) are disclosed in U.S. Patent No. 2,661,309 granted on December 1, 1953 to J. L. Azorlosa.

The treatment of coated cellulosic webs with alum or other polyvalent metal salt solution is a troublesome added step which generally requires structural modification of paper-coating machinery.

The discovery has now been made that fluid aqueous mineral pigment slurries containing a tripolymer such as is formed by interacting acrylic acid, acrylamide, and acrylonitrile as principal adhesive, as more particularly hereinafter set forth below, develop excellent adhesion and wet-rub values directly on application to cellulose webs followed by drying, and that treatment of the coated webs with aqueous alum solution is not required. The compositions of the present invention may thus be regarded as self-insolubilizing.

The invention does not primarily depend upon the kind or amount of pigment employed or the amount of water present, but does depend upon the particular formulation of the adhesive. The adhesive is a polymer chiefly formed from acrylic acid, acrylamide, and acrylonitrile in ratio defined by parallelogram ABCD of the drawing. Broadly, we have found that satisfactory self-insolubilizing coatings are obtained when the adhesive is formed by interpolymerizing a mixture of monomers composed of 5% to 50% by weight of acrylic acid, 20% to 85% by weight of acrylamide, and 5% to 40% by weight of acrylonitrile in ratios more particularly defined herein with regard to the drawing. Such compositions may be used over the pH range of 3.5 to 8.5.

We have found that for use in coating colors having a substantially neutral pH (e.g., a pH within the range of 6–7.5) the resin is preferably formed by interpolymerizing a mixture of monomers composed of 10% to 50% by weight of acrylic acid, 30% to 80% of acrylamide, and 5% to 25% of acrylonitrile, and that for use in compositions having a distinctly acid pH (pH 3.5–6) the resin is preferably formed by interpolymerizing a mixture of monomers composed of 5% to 45% by weight of acrylic acid, 20% to 80% of acrylamide, and 10% to 40% of acrylonitrile. These ratios are likewise more particularly defined herein with regard to the drawing.

We have finally found that a ratio of tripolymer components exists which gives particularly good results at both acid and neutral pH values, within the range of about 3.5–7.5. Such interpolymers are advantageously prepared from a mixture of monomers composed of 15% to 45% by weight of acrylic acid, 30% to 65% by weight of acrylamide, and 15% to 25% by weight of acrylonitrile, again as more particularly defined with regard to the drawing. These monomers may respectively be replaced in whole or in part with methacrylic acid, methacrylamide or methacrylonitrile, with similar results.

The foregoing compositions are illustrated in the drawing which represents a three-phase diagram defining the adhesives used in the compositions of the present invention, in terms of the mixture of monomers from which the adhesives are prepared. In the drawing, parallelogram ABCD circumscribes the area of the ratios of monomer components generally used in the practice of the present invention.

Upper ellipse E circumscribes the proportions of monomers from which adhesives result which are particularly advantageous when used in the pH range of 6 to 7.5.

Lower ellipse F circumscribes the proportions of monomers from which adhesives result which are most effectively at acid pH values.

Intermediate ellipse G (shaded) circumscribes the proportion of monomers from which adhesives result which yield very satisfactory results under both acid and neutral pH conditions. Adhesives of this composition are therefore particularly advantageous.

In general, adhesives prepared from mixture of monomers in ratios not within area ABCD of the graph are unsatisfactory, and yield poor adhesion values, poor wet rub values, or lack requisite water-solubility.

The polymers falling within parallelogram ABCD of the drawing are soluble in all proportions in water either at room temperature (20°–35° C.) or at elevated temperature (i.e., temperatures up to the boil). The polymers which are preferred for use in the compositions of the present invention are those which are soluble in water at room temperature. Polymers which are soluble only at elevated temperature are also suitable for use, but are less advantageous because coating compositions prepared therewith are necessarily applied hot, and the resulting evaporation of water causes the viscosity of the composition to increase.

The invention is not limited to any particular pigment material or to any particular amount of tripolymer in the coating composition. As pigment materials, there may be used any hydrophilic inorganic pigment heretofore used in the manufacture of paper including paper-coating clay, titanium dioxide, calcium carbonate, barium sulfate, silica, and mixtures thereof.

The polymer is used in minor but effective amount as binder. For this purpose 5% to 15% or 20% thereof, base on the weight of the pigment, may be used depending chiefly on the adhesiveness desired, but a greater or less amount is within the scope of the invention.

The coating composition may additionally contain such other components as are customarily present therein, including colorants (e.g., ultramarine, phthalocyanine green or blue, and Hansa yellow), supplementary adhesives such as glue and starch; fungicides, antiseptics, rewetting agents, anti-static agents, etc.

The polymers may be prepared in any customary manner. One simple and effective well-known method comprises forming a mixture of the acrylic acid, acrylamide and acrylonitrile in weight ratio falling within parallelogram ABCD of the drawing, slowly running the mixture into agitated hot water containing a small amount of a peroxygen catalyst (0.01%–2% on the weight of the polymer) depending on the molecular weight of polymer desired, and maintaining the mixture at a temperature between 70° C. and reflux until polymerization has proceeded to the desired molecular weight. A clear amber viscous solution of the polymer results.

The reaction is continued at least to the point where the polymer develops adhesive properties (corresponding to a molecular weight of about 5,000 to 20,000) and is advantageously continued to the point where the adhesive properties of the polymer level off (molecular weight 50,000–500,000), such polymers possessing good adhesiveness and comparatively low viscosity. The maximum molecular weight may be greater, up to about 5,000,000 or more, and is limited only by viscosity considerations.

The minimum molecular weight of the polymer may also be stated in terms of "relative viscosity," that is, the flow time of a solution of one gram of the polymer in 50 cc. of 0.5% aqueous ammonia divided by the flow time of a like amount of the solvent (0.5% aqueous ammonia) without any polymer in solution therein, both measured in the same viscosimeter and at the same temperature. The polymers used in compositions of the present invention have a minimum relative viscosity of 15 determined in this manner, and preferably in excess of 50.

The chief function of the water in the coating composition is to govern the viscosity and in general the amount present is that sufficient to give a viscosity within the range of 100–300 centipoises at application temperature. The amount required in any instance depends chiefly upon the molecular weight and composition of the polymer and size and shape of the pigment particles. In general, with preferred polymers of molecular weight between about 50,000 and 1,000,000 the coating composition consists essentially of 50%–75% by weight of the pigment or mixture of pigments, 5%–15% of polymer based on the weight of the pigment and water to adjust the viscosity to within application range.

The invention will be more particularly described in the examples which follow. The examples represent specific embodiments of the invention and are not to be construed as limitations thereof.

EXAMPLE 1

The following illustrates the preparation, application and testing of a series of fluid coating compositions according to the present invention to show the effect of the particular polymer employed in each instance and the pH of the composition on the dry bonding strength and wet-rub resistance of the applied coatings.

The coating compositions were made as follows.

A paper-coating clay slip was prepared by rapidly agitating a high quality commercial paper-coating clay (particle size range 95% between 0.5 and 5 microns) at 68.5% solids in water containing 0.2% sodium carbonate and 0.2% sodium tetraphosphate on the weight of clay as dispersing aids.

The adhesives were prepared by polymerizing 10 parts by weight of the monomer or mixture of monomers shown in the table below, in 90 parts of water until a solution was obtained having a viscosity of 1,000–5,000 centipoises. The solutions were then mixed with aliquots of the clay slip to provide in each instance a composition containing 10% of polymer based on the dry weight of the pigment. The solids content of the compositions (pigment plus polymer) was then adjusted to 45%–50% by addition of water, and hydrochloric acid or sodium hydroxide added as necessary to adjust the pH to the values shown in the table.

The compositions were applied to standard 50 lb. (25″ x 38″/500 ream) coating raw stock in uniform manner by means of a Bird laboratory applicator having an orifice of sufficient thickness to deposit a coating having a thickness of approximately 15 lb. (per 25″ x 38″/500 ream). The coated sheets were dried in air at room temperature, oven dried for three minutes at 210° F., and calendered. In each instance a smooth glossy sheet was obtained.

The sheets were conditioned at 73° F. and 50% relative humidity and tested. The dry adhesiveness of the coating to the paper was determined by the Dennison wax pick method and resistance of the coating to water was determined by the wet-rub method, wherein the sheet under test is laid flat with black paper underlying one edge and the test sheet is rubbed firmly three times under uniform pressure with a moist thumb in an effort to rub coating composition from the test sheet to the black sheet. A value of 0 designates a coating which has no wet-rub resistance (substantially all the coating being rubbed on to the black sheet), a value of 10 designates substantially complete wet-rub resistance (substantially no coating being rubbed off), and intermediate values designate intermediate results.

The results are shown in the table below.

| No. | Coating Composition | | | | | Test Results | |
|---|---|---|---|---|---|---|---|
| | Adhesive [1] | | | Physical properties | | Wax Pick [3] | Wet Rub [4] |
| | Percent AN | Percent AA | Percent AM | Percent Solids [2] | pH | | |
| 1 | 20 | 20 | 60 | 46.8 | 4.0 | 13 | 10 |
| 2 | 20 | 20 | 60 | 50 | 7.5 | 11.5 | 6 |
| 3 | 30 | 20 | 50 | 44.8 | 4.2 | 13 | 9 |
| 4 | 30 | 30 | 40 | 46.8 | 4.3 | 13 | 9 |
| 5 | 30 | 30 | 40 | 50 | 7.2 | 6.5 | 6 |
| 6 | 22.5 | 7.5 | 70 | 46.8 | 7.0 | 6 | 5 |
| 7 | 16.5 | 8.5 | 75 | 46.8 | 7.2 | 8 | 4 |
| 8 | 13 | 9 | 78 | 46.8 | 7.2 | 12 | 5 |
| 9 | 10 | 10 | 80 | 50 | 3.6 | 7.5 | 7 |

[1] AN=acrylonitrile; AA=acrylic acid; AM=acrylamide. Percentages are by weight.
[2] Adhesive plus pigment based on total weight of composition.
[3] Dennison.
[4] For method and explanation of values see text above.

If plotted in the drawing, compositions 1 and 2 would appear in ellipse G, compositions 3, 4 and 5 in ellipse F, compositions 7 and 8 in ellipse E, and composition 6 outside of the ellipses but within parallelogram ABCD.

EXAMPLE 2

The difference in effectiveness between coating compositions containing adhesive polymers of comparatively high and low relative viscosity is illustrated by the following.

Polymer 1 (High Molecular Weight)

Into a two-liter, three-necked flask equipped with stirrer, condenser, thermometer, electric heating mantle, three dropping funnels and nitrogen-gas inlet tube was added 600 gm. of water and heated to 60° C. The following were added drop-wise in half an hour through the funnels: (a) a solution of 100 gm. of acrylamide and 50 gm. of acrylic acid in 100 gm. of water; (b) 50 gm. of acrylonitrile; and (c) a solution of 0.400 gm. of ammonium persulfate in 100 gm. of water. The reaction mixture was stirred at 60° C. for 3½ hours, at which point formation of polymers was substantially complete. The polymer was filtered, washed with water, and dried overnight in vacuum.

*Polymer 2 (Low Molecular Weight)*

The above procedure was repeated except that a 50% isopropanol/water mixture was used in place of the water previously employed, so as to prepare a low molecular weight polymer.

The relative viscosity of the polymers was determined as follows. In each instance one gram of polymer was dissolved in 50 cc. of 0.5% aqueous ammonium hydroxide and the flow time of the resulting solution determined at 30° C. in a Cannon-Fenske-Ostwald type viscosimeter together with the comparable flow time of 0.5% aqueous ammonium hydroxide solution. Relative viscosity was determined by dividing the former value by the latter.

The coating compositions were applied to paper using a 0.00075″ Bird applicator and the sheets were dried at 300° F. for 2 minutes. The wax pick and wet rub values were obtained in accordance with the method of Example 1. Results were as follows.

| Polymer Solution | | Coated Paper | |
|---|---|---|---|
| No. | Rel. Visc. | Wax Pick | Wet Rub |
| 1 | 52.2 | 7 | 8 |
| 2 | 2.79 | 2 | 0 |

We claim:
1. A fluid aqueous coating composition for water-laid cellulose webs comprising a hydrophilic inorganic mineral pigment as coating component and a water-soluble tripolymer as principal adhesive component, said tripolymer being formed by polymerizing a mixture of 5% to 50% by weight of acrylic acid, 20% to 85% by weight of acrylamide, and 5% to 40% by weight of acrylonitrile, having a "relative viscosity" to aqueous ammonia in excess of 15, and being soluble in all proportions in water at 35° C., the relative amounts of each of the constituents of said polymer being chosen so as to be represented by any point within parallelogram ABCD of the annexed drawing, said coating composition having a pH between about 3.5 and 8.5.

2. A coating composition according to claim 1 wherein the tripolymer is formed by polymerizing a mixture of 10% to 50% by weight of acrylic acid, 30% to 80% by weight of acrylamide, and 5% to 25% by weight of acrylonitrile, the relative amounts of each of said constituents being chosen so as to be represented by any point within ellipse E of the annexed drawing, said composition having a pH between about 6 and 7.5.

3. A coating composition according to claim 1 wherein the tripolymer is formed by polymerizing a mixture of 5% to 45% by weight of acrylic acid, 20% to 80% by weight of acrylamide, and 10% to 40% by weight of acrylonitrile, the relative amounts of each of said constituents being chosen so as to be represented by any point within ellipse F of the annexed drawing, said composition having a pH between about 3.5 and 6.

4. A coating composition according to claim 1 wherein the tripolymer is formed by polymerizing a mixture of 15% to 45% by weight of acrylic acid, 30% to 65% by weight of acrylamide, and 15% to 25% by weight of acrylonitrile, the relative amounts of each of said constituents being chosen so as to be represented by any point within ellipse G of the annexed drawing, said composition having a pH within the range of 3.5 and 7.5.

5. A composition according to claim 1 wherein the polymer has a "relative viscosity" in excess of 50.

6. A fluid aqueous composition according to claim 1 wherein the pigment is paper-coating clay.

References Cited in the file of this patent

UNITED STATES PATENTS

| 2,632,704 | Lowe et al. | Mar. 24, 1953 |
| 2,661,309 | Azorlosa | Dec. 1, 1953 |
| 2,893,977 | Suen et al. | July 7, 1959 |